United States Patent

Ohe et al.

[11] Patent Number: 5,910,271
[45] Date of Patent: Jun. 8, 1999

[54] ACTIVE MATRIX TYPE LIQUID CRYSTAL DISPLAY APPARATUS

[75] Inventors: Masahito Ohe, Hitachi; Katsumi Kondo; Masuyuki Ota, both of Hitachinaka; Shuichi Ohara, Hitachi, all of Japan

[73] Assignee: Hitachi, Ltd., Tokyo, Japan

[21] Appl. No.: 08/697,014

[22] Filed: Aug. 16, 1996

Related U.S. Application Data

[63] Continuation of application No. 08/388,506, Feb. 14, 1995, abandoned.

[30] Foreign Application Priority Data

Jan. 14, 1994 [JP] Japan ................................ 6-017098

[51] Int. Cl.$^6$ ........................ C09K 19/52; G02F 1/1337
[52] U.S. Cl. ..................... 252/299.01; 349/19; 349/33; 349/41; 349/84; 349/122; 349/132; 349/191
[58] Field of Search ................... 252/299.01; 428/1; 349/182, 19, 33, 41, 84, 122, 132, 191

[56] References Cited

U.S. PATENT DOCUMENTS

| | | |
|---|---|---|
| 4,345,249 | 8/1982 | Togashi . |
| 5,167,860 | 12/1992 | Sawada et al. ................ 252/299.63 |
| 5,598,285 | 1/1997 | Kondo et al. ..................... 349/39 |
| 5,600,464 | 2/1997 | Ohe et al. ........................ 349/123 |
| 5,737,051 | 4/1998 | Kondo et al. .................... 349/141 |

FOREIGN PATENT DOCUMENTS

| | | |
|---|---|---|
| 0 588 568 A3 | 3/1994 | European Pat. Off. . |
| WO91/10936 | 1/1991 | WIPO . |

Primary Examiner—Shean C. Wu
Attorney, Agent, or Firm—Antonelli, Terry, Stout & Kraus, LLP

[57] ABSTRACT

A liquid crystal display apparatus, having a designated drive composed of a group of electrodes forming pixels in a n×m matrix and active devices, in which the electrodes have a structure such that an electric field parallel to the interface can be applied to the liquid crystal composite layer, and the cell-gap between substrates facing each other is 6 μm or less and the response time is less than or equal to 100 ms, and greater than or equal to 1 ms.

15 Claims, 4 Drawing Sheets

ACTIVE MATRIX TYPE LIQUID CRYSTAL DISPLAY APPARATUS

This application is a continuation of prior application Ser. No. 08/388,506, filed on Feb. 14, 1995, now abandoned.

BACKGROUND OF THE INVENTION

The present invention relates to a liquid crystal display apparatus and, more particularly, to an active matrix liquid crystal display apparatus.

In the conventional liquid crystal display apparatus, the electrodes for driving the liquid crystal layer, the electrodes are formed on the surface of two substrates, and transparent electrodes are used, each electrode facing the other. This is because what is used is a display method represented by a Twisted Nematic display method in which the liquid crystal layer is driven by applying an electric field in a transverse direction with respect to the surface of the substrate. On the other hand, for the display method in which an electric field is applied in the direction almost parallel to the surface of the substrate, a display method using comb-type electrodes is disclosed in the Japanese Patent No. 63-21907 (1988) and in U.S. Pat. No. 4,345,249. In this case, the electrodes are not necessarily selected to be transparent, but non-transparent and metallic electrodes with higher electrical conductivity are used. However, in the above description of conventional systems, for both the display method in which the electric field is applied in a direction with respect to the surface of the electrode, (which is designated an "In-plane switching method"), specifically used in the active matrix drive mode, and the horizontal electric field method with low voltage drive, the enabling material property of the liquid crystal layer and the device structure are not described in detail.

In the horizontal electric field method, it is required to make the electrode gap wider in order to attain a higher cross-section for the open port, which raises a problem that the necessary drive voltage becomes higher. In addition, in order to allow the use of a mouse as a pointing device in the liquid crystal display apparatus, it is required to establish a response time between 150 ms and 200 ms, and for enabling a motion picture resolution, the response time is required to be 50 ms. However, since the response of a liquid crystal to an electric field change is inherently slow, it often creates the problem that the response time of the liquid crystal is slow in various kinds of display methods using a Nematic Liquid Crystal. This is not exceptional in the horizontal electric field method. In addition, due to the electrode structure specific to the horizontal electric field method, the electric field will tend not to be fully applied to the liquid crystal, which results in a slower response of the liquid crystal. Thus, some means is required in order to reduce the drive voltage, to enable use of a mouse and to provide an improved motion picture resolution.

SUMMARY OF THE INVENTION

The object of the present invention is to provide an active matrix type liquid crystal display apparatus which has a high-speed response to allow a mouse to be used as a pointing device or to enable enhanced motion picture resolution in the horizontal electric field method.

In accordnace with the present invention, the following features are employed for solving the above mentioned problems and for attaining the above objective.

The present invention includes a pair of substrates, at least one of which is transparent; a liquid crystal composite layer arranged between the substrates; electrodes on the substrates for applying an electric field substantially parallel to the substrates; an orientation control layer for controlling the orientation of the molecule of the liquid crystal; a polarization means; and a drive means; in which the gap between the substrates is less than or equal to 6 $\mu$m, and the response time is less than or equal to 100 ms, and greater than or equal to 1 ms.

The relationship between the dielectric constant of the liquid crystal composite material layer, ($\epsilon_{LC}$)//: dielectric constant measured in the direction of the longitudinal axis of the molecule, ($\epsilon_{LC}$)⊥: dielectric constant measured in the direction the tranverse axis of the molecule), and the dielectric constant of the orientation control layer, ($\epsilon_{AF}$), is represented by the equation (1).

$$(\epsilon_{LC})// > 2\epsilon_{AF}, \text{ or } (\epsilon_{LC})\perp > 2\epsilon_{AF}, \qquad (1)$$

Further, the relationship between the viscosity of the liquid crystal composite material layer, $\eta$, and the elasticity constant of the twist, $K_2$, is represented by the equation (2).

$$\eta/K_2 < 4.5 \times 10^{10} [s \cdot m] \qquad (2)$$

Furthermore, the liquid crystal composite material according to the present invention is made to include a liquid crystal chemical compound represented by the general chemical formula (I), in which a fluoro group or cyano group, or both of them coexist as an end group.

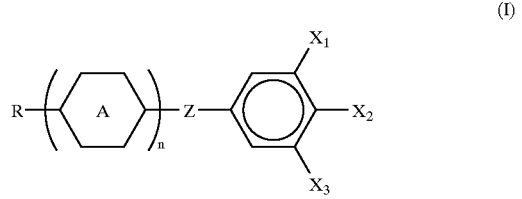

(I)

In the chemical formula (I), $X_1$, $X_2$ and $X_3$ are a fluoro group, cyano group or hydrogen atom; R is an alkyl group or alkoxyl group having the carbon number 1 to 10, which is replaceable; Ring A is a cyclohexane ring, benzene ring, dioxane ring, pyrimidine ring, or [2,2,2]-bicyclooctane ring; Z is a single bonding, ester bonding, ether bonding, or methylene, or ethylene; and n is an integer 1 or 2.

Preferably, the liquid crystal composite material may be made so as to include a liquid crystal chemical compound represented by the general chemical formula (I), in which a fluoro group or cyano group, or both of them, coexist as an end group.

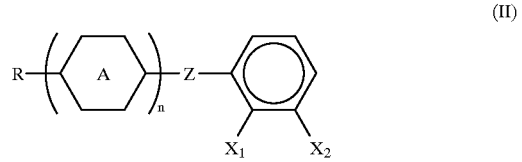

(II)

In the chemical formula (II), $X_1$ and $X_2$ are a fluoro group, cyano group or hydrogen atom; R is an alkyl group or alkoxyl group having the carbon number 1 to 10, which is replaceable; Ring A is a cyclohexane ring, benzene ring, dioxane ring, pyrimidine ring, or [2,2,2]-bicyclooctane ring; Z is a single bonding, ester bonding, ether bonding, or methylene, or ethylene; and n is an integer 1 or 2.

Preferably, the retardation of the liquid crystal composite material layer, d·$\Delta$n, may be greater than or equal to 0.21 $\mu$m and less than or equal to 0.36 $\mu$m.

DETAILED DESCRIPTION OF THE PREFERRED EMBODIMENTS

Figure 4:
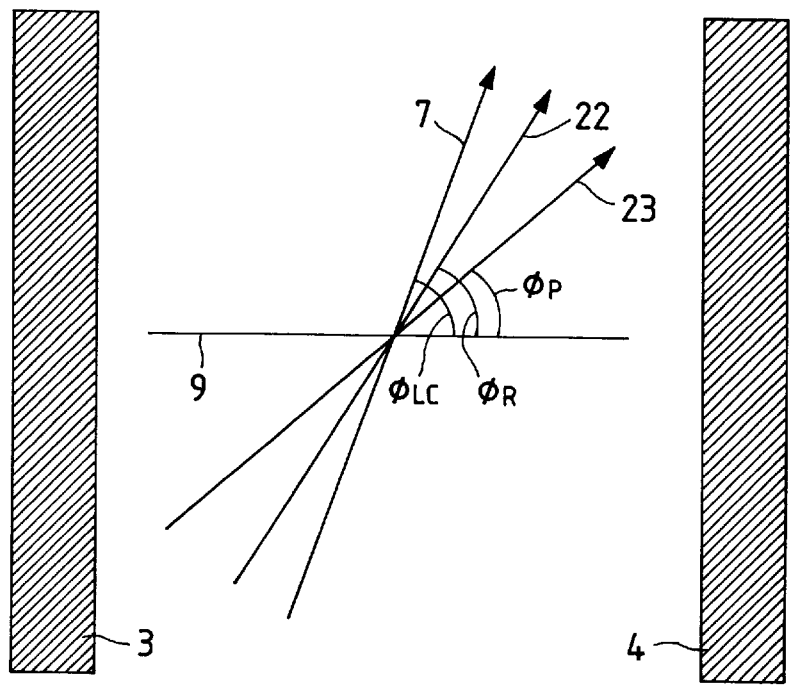
FIG. 4 shows the angle $\phi_P$ defined by the polarization transmission axis, the angle $\phi_{LC}$ defined by the liquid crystal molecule longitudinal axis (optical axis) in the neighborhood of the interface, and the angle $\phi_R$ defined by the condensive axis in the phase shifter plate, each with respect to the electric field direction in embodiments 1 to 5 and comparison examples 1 and 2.

In FIG. 4, the angle $\theta_P$ is defined by the polarization transmission axis, the angle $\phi_{LC}$ is defined by the liquid crystal molecule longitudinal axis (optical axis) in the neighborhood of the interface, and the angle $\phi_R$ is defined by the condensive axis in the phase shifter plate inserted between a couple of polarizers. The angles $\phi_P$ and $\phi_{LC}$ are expressed selectively in terms of $\phi_{P1}$, $\phi_{P2}$, $\phi_{LC1}$ and $\phi_{LC2}$ as there are a couple of polarizers and a couple of liquid crystal interfaces.

Figure 1A:
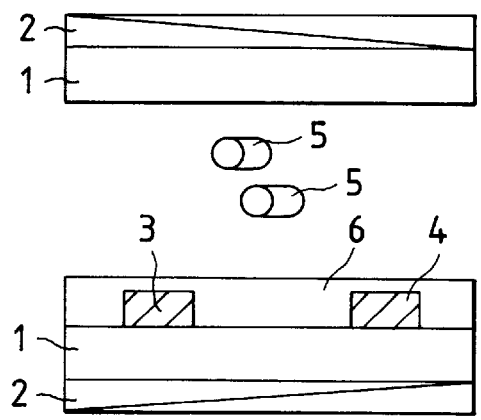
FIGS. 1(a) to 1(d) are diagrams which show the operation of the liquid crystal in a liquid crystal display apparatus of the horizontal electric field type.
Figure 1B:
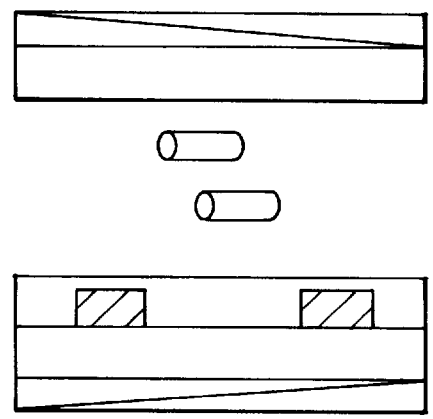
Figure 1C:
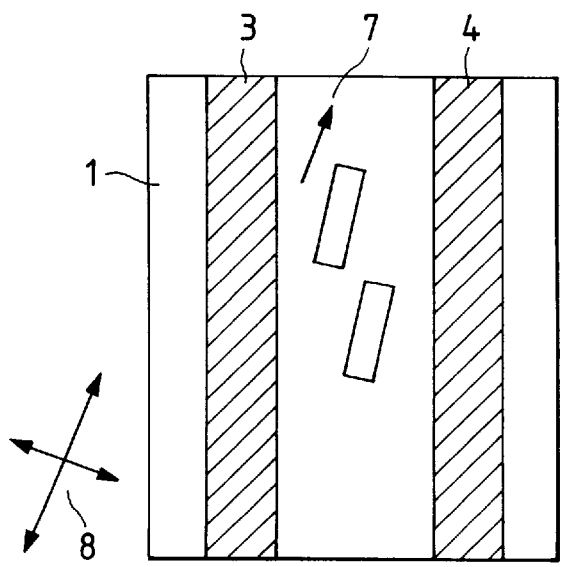
Figure 1D:
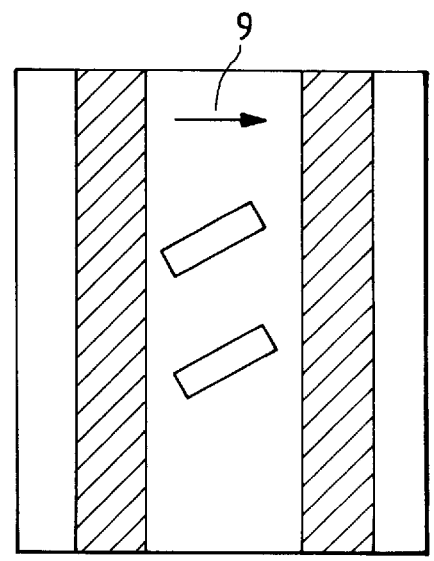

FIGS. 1(a) and 1(b) show side cross-section views showing the operation of the liquid crystal in the liquid crystal panel, and FIGS. 1(c) and 1(d) show front views thereof in accordance with the present invention. In FIGS. 1(a) to 1(d), active devices are not shown. In addition, though a plurality of pixels are formed with striped electrodes in the present invention, a partial view of a single pixel is shown in FIGS. 1(a) to 1(d). The side cross-section view when voltage is not applied is shown in FIG. 1(a) and the front view thereof is shown in FIG. 1(c). The linear electrodes 3 and 4 are formed inside a couple of transparent substrates, and a couple of orientation films 6 are coated on the substrates so that they face each other. Liquid crystal composite material is inserted between the films. The liquid crystal molecule 5, shaped in line, is oriented so that the angle $\phi_{LC}$ of the longitudinal axis of the molecule between the longitudinal direction of the Y electrode, shaped in stripe may be maintained to be an adequate angle, such as $45°\leq|\phi_{LC}|<90°$. For purpose of explanation, the orientation direction of the liquid crystal molecule on the upper and lower interfaces is assumed to be parallel to each other, that is, $\phi_{LC}1=\phi_{LC}2$. The dielectric anisotropy of the liquid crystal composite material is assumed to be positive. Next, when the electric field 9 is applied, as shown in FIGS. 1(b) and (c), the axis of the liquid crystal molecule is oriented in the direction of the electric field. By placing the polarizer 2 with a designated angle 8, it is possible to modulate the optical transmission index by applying and changing the electric field. Thus, the display operation for defining contrast is possible without transparent electrodes. Though the dielectric anisotropy of the liquid crystal composite material is assumed to be positive, it may be selected to be negative. In case of a negative dielectric anisotropy, as for the initial orientation of the liquid crystal molecule, the angle $\phi_{LC}$ is maintained at an adequate angle to the vertical direction with respect to the longitudinal axis of the striped electrode, such as $0°<|\phi_{LC}|\leq 45°$.

The response time in the horizontal electric field method can be derived by solving the torque balance equation in terms of elastic torque, electro-magnetic torque and viscous torque. The rise time and the fall time of the liquid crystal result in the following expression.

$$\tau_{rise}=\gamma 1/(\epsilon_0\Delta\epsilon E^2-\pi^2 K_2/d^2), \qquad (3), \text{ and}$$

$$\tau_{fall}=\tau_1 d^2/\pi^2 K_2=\gamma 1/\epsilon 0\Delta\epsilon E_c^2, \qquad (4)$$

where $\tau_{rise}$ is the rising-up time, $\tau_{fall}$ is the falling-down time, $\gamma 1$ is viscosity coefficient, $K_2$ is the elastic constant of the twist, d is the cell gap, $\Delta\epsilon$ is the dielectric anisotropy, $\epsilon_0$ is the vacuum dielectric index, E is the electric field intensity, and $E_c$ is the threshold electric field intensity.

The above equation shows that the response time can be reduced by making smaller the cell gap d between the substrates facing each other. As for making the cell gap d smaller, the fall time decreases proportionally to the reciprocal of the square of the cell gap d. On the other hand, since the second term of the denomination of the expression of the rise time is smaller than its first term, the rise time is not extended even by making the cell gap smaller.

Figure 5:
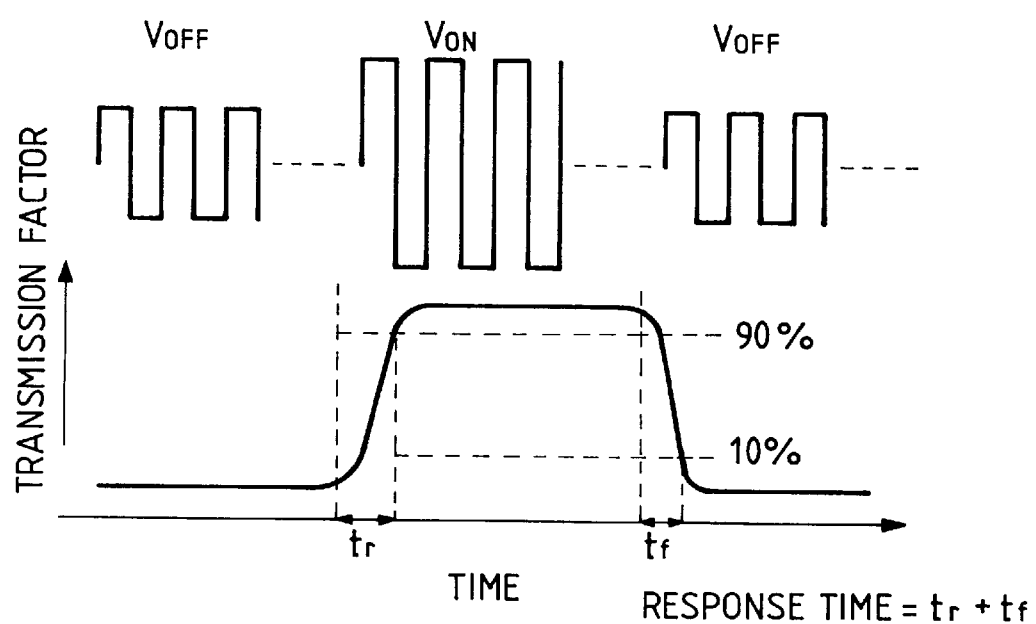
FIG. 5 is a timing diagram showing a feature of the response time.

Therefore, to make the cell gap between the substrates facing each other 6 μm or less, as described in this first feature provides a prospective way to establish a response time which is less than or equal to 100 ms, preferably, less than or equal to 5 μm. In the above definition, as shown in FIG. 5, the response time is defined to be the time period, while the transmission ratio changes, required for a 90% fraction of its switching operation between the minimum voltage and the maximum voltage.

Figure 6:
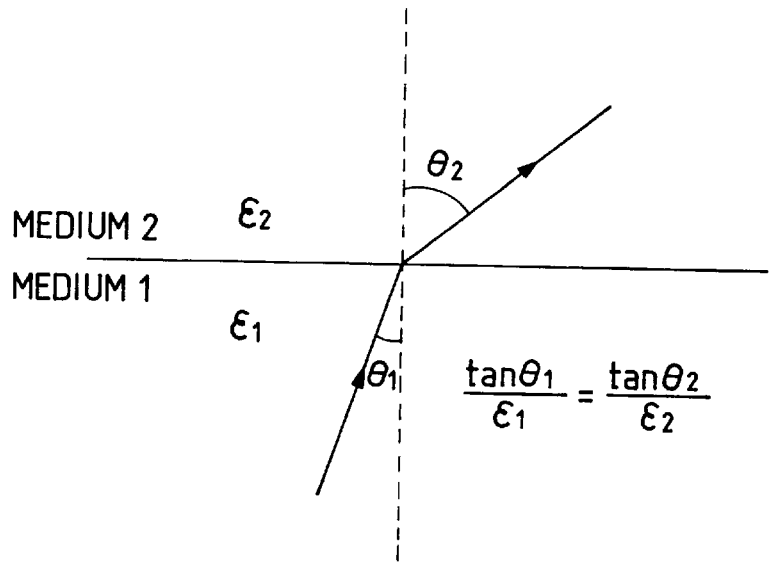
FIG. 6 is a diagrammatic view showing the diffraction of the electric field at an interface on the dielectric layer.

As described in a second feature, by setting the relationship between the dielectric constant of the liquid crystal composite material layer, ($\epsilon_{LC}$)//: dielectric constant measured in the longitudinal axis of the molecule, ($\epsilon_{LC}$)⊥: dielectric constant measured in the shorter axis of the molecule), and the dielectric constant of the orientation control layer, ($\epsilon_{AF}$), is made to satisfy the equation ($\epsilon_{LC}$)//$>2\epsilon_{AF}$, or ($\epsilon_{LC}$)⊥$>2\epsilon_{AF}$, and by setting the relationship between the viscosity of the liquid crystal composite material layer, η, and the elasticity constant of the twist, $K_2$, to satisfy the equation, $\eta/K_2<45[\text{Gs}/(\text{m}\cdot\text{m})]$, it will be appreciated that a liquid crystal display apparatus with high-speed response can be established. In the ordinary horizontal electric field method, as the thickness of the electrode is smaller than the thickness of the liquid crystal composite material layer, an electric field completely parallel to the interface between the liquid crystal and the orientation layer can not be completely applied to the liquid crystal layer. This incomplete horizontal electric field reduces the efficiency in switching the liquid crystal on the interface. Since the refraction of the electric field between the two-layered dielectric material layer is formed as shown in FIG. 6, by making the dielectric constant $\epsilon_{LC}$ of the liquid crystal larger than the dielectric constant $\epsilon_{AF}$ of the orientation layer, preferably by making $\epsilon_{LC}$ twice as large as $\epsilon_{AF}$, what can be applied to the liquid crystal is a horizontal electric field which is more nearly parallel to the interface between the liquid crystal and the orientation layer. Therefore, the required horizontal electric field can be supplied efficiently to the liquid crystal for switching the liquid crystal on the interface. In addition, with more intensive study, in which the viscosity η of the liquid crystal is modified to be smaller or the elasticity constant $K_2$ of the twist is modified to be larger, a high-speed response, which enables use of a mouse and enhanced motion picture resolution, can be attained when the ratio between the viscosity and the elasticity constant is 45 [Gs/(mm)].

Furthermore, it has been proven that the liquid crystal shown in third feature above is adapted to the conditions given by the first and second features, and that a high-speed response which enables use of a mouse and enhancement of the motion picture resolution, can be attained. Since a trifluoro-type liquid crystal having a molecular structure with a fluoro group at the molecular end has a larger dielectric anisotropy Δε, about 7, and a smaller viscosity η between 20 cp and 30 cp, it is also possible to make the drive voltage smaller and the response time shorter by adding this type of liquid crystal to another liquid crystal. More specifically, one may use trans-4-heptyl-(3,4,5-trifluorophenyl)cyclohexane; 1,2,6-trifluoro-4-[trans--4-(trans-4-propylcyclohexyl)cyclohexyl]benzene; Trans-4-propyl-(3,4,5-trifluorobiphenyl-4'-yl)cyclohexane; 2-(trans-4-propylcyclohexyl)-1-[trans-4-(3,4,5-trifluorophenyl)cyclohexyl]ethane; 3,4,5-trifluorophenyl-trans-4-bentylecyclohexylcarboxylate; Trans-4-heptyl-(3,4-difluorophenyl)cyclohexane; 1,2-difluoro-4-[trans-4-(trans-4-propylcyclohexyl)cyclohexyl]benzene; Trans-4-propyl-(3,4,difluorobiphenyl-4'-yl)cyclohexane; 2-(trans-4-propylecyclohexyl)-1-[trans-4-(3,4-difluorophenyl)cyclohexyl]ethane; 3,4-difluorophenyl-trans-4-bentylecyclohexylcarboxylate; Trans-4-heptyl-(4-cyanophenyl)cyclohexane; 1,2-dicyano-4-[trans-4-(trans-4-propylcyclohexyl)cyclohexyl]benzene; Trans-4-propyl-(3,4-dicyanobiphenyl-4'-yl)cyclohexane; 2-(trans-4-propylcyclohexyl)-1-[trans-4-(3,4-dicyanophenyl)cyclohexyl]ethane; 3,4-dicyanophenyl-trans-4-bentylcyclohexylcarboxylate; 4-cyano-3-fluorophenyl-trans-4-propylcyclohexylcarboxylate. The present invention does not exclude compounds other than the above. The liquid crystal compound having a fluoro group at the ortho position in its cyano end group, represented by 4-cyano-3-fluorophenyl-trans-4-propylcyclohexylcarboxylate, is known to be a material which does not tend to form dimer to cancel the dipole momentum. Since such a liquid crystal compound has a larger dielectric constant and a lower viscosity, it is effective to apply this kind of compound to a high-speed driving operation in the horizontal electric field method.

Furthermore, it has been proven that the liquid crystal shown in the fourth feature above is adapted to the conditions given by the first and second means, and that a high-speed response which enables use of a mouse and provides enhancement of the motion picture resolution can be attained. More specifically, one may use trans-4-heptyl-(2,3-difluorophenyl)cyclohexane; 2,3-difluoro-4-[trans-4-(trans-4-propylcyclohexyl)cyclohexyl]benzene; Trans-4-propyl-(2,3-difluorobiphenyl-4'-yl)cyclohexane; 2-(trans-4-propylcyclohexyl)-1-[trans-4-(2,3-difluorophenyl)cyclohexyl]ethane; 2,3-difluorophenyl-trans-4-bentylecyclohexylcarboxylate; Trans-4-heptyl-(2-cyano-3-fluorophenyl)cyclohexane; 2-cyano-3-fluoro-4-[trans-4-(trans-4-propylcyclohexyl)cyclohexyl]benzene; Trans-4-propyle-(2-cyano-3-fluorobiphenyl-4'-yl)cyclohexane; 2-(trans-4-propylcyclohexyl)-1-[trans-4-(2-cyano-3-fluorophenyl)cyclohexyl]ethane; 2-cyano-3-fluorophenyl-trans-4-bentylecyclohexylcarboxylate. The present invention does not exclude compounds other than the above.

In the above described features for driving the cell with high-speed response, from the view point that the overall design of the display device should satisfy many aspects of characteristics and performances other than response time, such as brightness and contrast ratio, the retardation of the liquid crystal, d·Δn, is determined, for example, as follows. In a case of displaying in multiple diffraction mode as described before, the intensity of the transmitted light is defined by the following equation when arranging a couple of polarizers in a cross-Nicole arrangement.

$$I/I_0 = \sin^2(2\alpha) \cdot \sin^2(\pi d \cdot \Delta n / \lambda), \tag{5}$$

where a is the angle defined by the effective light axis of the liquid crystal layer and the polarization transmission axis;

d is the cell gap;

Δn is the anisotropic property of the refractive index of the liquid crystal; and λ is the wavelength of light.

In order to obtain a normally-close characteristic in which the display pixel takes a dark state when a low-voltage is applied, and the display pixel takes a bright state when a high-voltage is applied, the layout arrangement of the polarizers should be such that, the transmission axis of one polarizer may be taken to be almost parallel to the orientation direction of the liquid crystal molecule (rubbing axis), which means $\phi_{P1} = \phi_{LC1} = \phi_{LC2}$, and the transmission axis of the other polarizer may be taken to be vertical to the rubbing axis, which means $\phi P1 = \phi_{P2} = 90°$. When the electric field is not applied, as when a in the equation (5) is 0, the light transmission index $I/I_0$ is also 0. In contrast, when the electric field is applied, a increases as the light intensity increases, and thus, the light transmission index $I/I_0$ takes its maximum value at a=45°. In this case, assuming that the wavelength of light is 0.555 μm, the effective $d_{eff} \cdot \Delta n$ may be taken to be 0.28 μm, half of the wavelength of light, in order to maximize the transmission index with no color tone. Since the liquid crystal molecules are fixed in the neighboring area of the interface in the actual cell, $d_{eff}$ is less than the cell gap d. Therefore, in order to attain a higher transmission index and a whiteness of the display emission light for the display pixel in the normally-close characteristics, taking a bright state in the multiple refraction mode, d·Δn is allowed to be taken to 0.30 μm which is a little larger than half of wavelength of light. In actual use, as there is a variable margin, d·Δn is allowed to be taken to between 0.21 μm and 0.36 μm.

From the view point described above, by making Δn, the anisotropic property of the refractive index of the liquid crystal used, relatively large, and setting the retardation, d·Δn, between 0.21 and 0.36 μm, as described in the fifth feature above for higher contrast, the gap between the substrates facing each other is necessarily selected to be small, which may lead to the prospective means for a high-speed response.

As described in formula (3) and formula (4), it is advantageous for high-speed response to select a liquid crystal with a lower viscosity. It is also possible to make the response faster by making the absolute value of the dielectric anisotropy of the liquid crystal, $|\Delta\epsilon|$, as large as possible. This is due to the fact that the interactive energy between the electric field and the liquid crystal becomes larger.

With the embodiments described below, the present invention will be described more in detail.

EMBODIMENT 1

Figure 2:
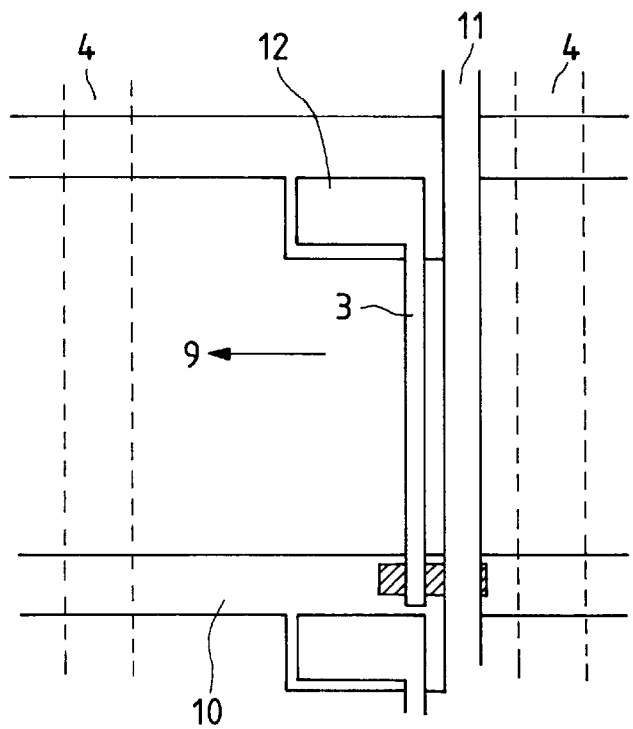
FIG. 2 is a plane view of a unit pixel in a liquid crystal display apparatus of the horizontal electric field type.
Figure 3:
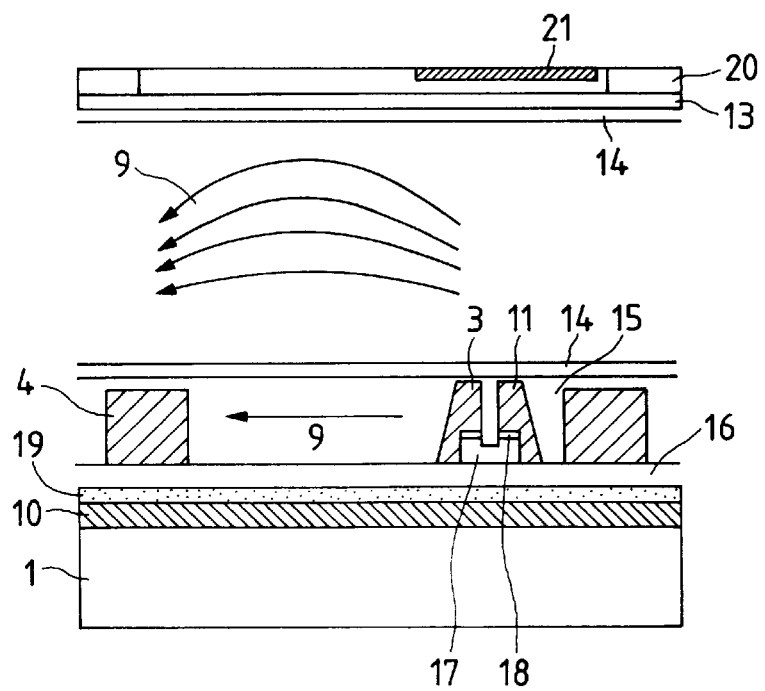
FIG. 3 is a cross-section view of the unit pixel in a liquid crystal display apparatus of the horizontal electric field type.

FIG. 2 shows a plane view of a unit pixel in a first embodiment of the present invention. FIG. 3 shows a cross section view of FIG. 2. A scanning electrode 10 composed of Al is formed on a polished glass substrate 1, and the surface of the scanning electrode is coated with an anodized film 19 of alumina. A gate nitridation layer 16 (gate SiN) and an amorphous Si layer (a-Si) 17 are formed so as to cover the scanning electrode 10. An n-type a-Si layer 18, a source electrode 3 and a picture signal electrode 11 are formed onto the a-Si layer 17. In addition, a common electrode 4 is attached onto a layer identical to the source electrode 3 and the picture signal electrode 11. As for the structure of the source electrode 3 and the picture signal electrode 11, as shown in FIG. 1, the extension of the these electrodes is parallel to common electrode 4 formed in stripe and intersects the scanning signal electrode 10 at right angle, and thus, thin film transistors (FIGS. 2 and 3) and the metallic electrodes are formed on one of the substrates. With these transistors and electrodes, the electric field is developed between the source electrode 3 and the common electrode 4 on one of the substrates so that the extension direction 9 of the developed electric field may be almost parallel to the interface of the substrate. The individual electrodes on the substrate are composed of aluminum, but the selection of metal is not limited to aluminum but allowed to be chromium or copper and so on. The number of pixels is selected to be 40 (X3) X30 (that is, n=120, and m=30). The horizontal pixel pitch, which is the distance between common electrodes, is 80 μm, and the vertical pixel pitch, which is the distance between gate electrodes, is 240 μm. The width of the common elecrode is 12 μm, which is made to be smaller than the distance between the common elecrodes, 68 μm, which leads to the larger open port rate. The color filter 20 formed in stripe for RGB colors is formed on the substrate facing against to the substrate on which the thin film transistors are formed. On the color filter 20, a transparent resin 13 for flattening the surface of the color filter is multiply coated. As the material for the transparent resin, epoxy resin is used. The drive LSI (large scale integrated circuit) is connected to the panel.

The material used for the liquid crystal compound has such a property that the anisotropic property of the refractive index, $\Delta n$, is 0.072, the dielectric anisotropy, $\Delta\epsilon$, is 3.7 ($\epsilon//$: 7.4, $\epsilon\perp$: 3.7), the viscosity, $\eta$, is 20 cp (20° C.), and the elasticity constant of the twist, $K_2$, is 8.4×10-8 dyn. Therefore, $\eta/K_2$ is 23.9[Gs/(m·m)]. The material used for the orientation layer is PIQ (Polyimide Quinazolinedione) with its relative dielectric constant, $\epsilon_{AF}$, being 2.8. Therefore, the relation, $(\epsilon_{LC})//>2\epsilon_{AF}$, holds. The individual rubbing direction of a couple of substrates is parallel to each other, and has an angle 105° ($\phi_{LC1}=\phi_{LC2}=105°$) against the direction in which the applied electric field is extended. See FIG. 4. The gap d between the substrates is formed and controlled with polymer beads dispersed between the substrates so as to be 3.8 μm and is liquid crystal filled.

The panel is sandwiched with a couple of polarizers (G1220DU, made by Nitto Electric Co.), and the polarization transmission axis of one polarizer is set to be parallel to the rubbing direction, which means $\phi_{P1}=105°$, and the polarization transmission axis of the other polarizer is set to intersect perpendicularly with the former polarization transmission axis, which means $\phi_{P2}=105°$. With this geometrical configuration, the normally-close characteristic of the display pixel can be established.

According to the measurement of the response time of the liquid crystal obtained in the above configuration, the rise time is 30 ms, and the fall time is 35 ms.

In the above definition, as shown in FIG. 5, the response time is defined to be the time period, while the transmission ratio changes, required for a 90% fraction of its switching operation between the minimum voltage and the maximum voltage.

EMBODIMENT 2

The structure in the embodiment 2 is identical to that of the embodiment 1 excluding the following features.

The material used for the liquid crystal compound is MLC-2011 (made by MELC, Co.), the major component of which is a 2,3-difluorobenzene derivative. In this material, $\eta/K_2$ is 27.8 [Gs/(m·m)]. The dielectric anisotropy of the liquid crystal of this embodiment, $\Delta\epsilon$, is −3.3 ($\epsilon//$: 3.1 $\epsilon\perp$: 7.1). Therefore, the relation, $(E_{LC})\perp>2E_{AF}$, holds. The gap d between the substrates is set to be 4.7 μm, and the retardation, d·$\Delta n$, is determined to be about 0.35 μm.

The individual rubbing direction of a couple of substrates is parallel to each other, and has an angle of 15° ($\phi_{LC1}=\phi_{LC2}=15°$) against the direction in which the applied electric field is extended. See FIG. 4. The panel is sandwiched with a couple of polarizers (G1220DU, made by Nitto Electric Co.), and the polarization transmission axis of one polarizer is set to be parallel to the rubbing direction, which means $\phi_{P1}=15°$, and the polarization transmission axis of the other polarizer is set to intersect perpendicularly with the former polarization transmission axis, which means $\phi_{P2}=-75°$. With this geometrical configuration, the normally-close characteristic of the display pixel can be established.

According to the measurement of the response time of the liquid crystal obtained in the above configuration, the rise time is 38 ms, and the fall time is 44 ms.

EMBODIMENT 3

The structure in the embodiment 3 is identical to that of the embodiment 1 excluding the following features.

The material used for the liquid crystal compound is MLC-2009 (made by MELC, Co.), the major component of which is a 2,3-difluorobenzene derivative. In this material, $\eta/K_2$ is 44.0 [Gs/(m·m)]. The dielectric anisotropy of the liquid crystal of this embodiment, $\Delta\epsilon$, is −3.4 ($\epsilon//$: 3.9 $\epsilon$195 : 7.3). Therefore, the relation, $(\epsilon_{LC})\perp>2\epsilon_{AF}$, holds. The gap d between the substrates is set to be 2.0 μm, and the retardation, d·$\Delta n$, is determined to be about 0.30 μm.

The individual rubbing direction of a couple of substrates is parallel to each other, and has an angle 15° ($\phi_{LC1}=\phi_{LC2}=15°$) against the direction in which the applied electric field is extended. See FIG. 4. The panel is sandwiched with a couple of polarizers (G1220DU, made by Nitto Electric Co.), and the polarization transmission axis of one polarizer is set to be parallel to the rubbing direction, which means $\phi_{P1}=15°$, and the polarization transmission axis of the other polarizer is set to intersect perpendicularly with the former polarization transmission axis, which means $\phi_{P2}=-75°$. With this geometrical configuration, the normally-close characteristic of the display pixel can be established.

According to the measurement of the response time of the liquid crystal obtained in the above configuration, the rise time is 40 ms, and the fall time is 20 ms.

EMBODIMENT 4

The structure in the embodiment 4 is identical to that of the embodiment 1 excluding the following features.

The material used for the liquid crystal compound is LIXON-5023 (made by Chisso, Co.), the major component of which is a 2,3-difluorobenzene derivative. In this material, $\eta/K_2$ is 42.0 [Gs/(m·m)]. The dielectric anisotropy of the liquid crystal of this embodiment, $\Delta\epsilon$, is 4.5 ($\epsilon//$: 8.2 $\epsilon\perp$: 3.7). Therefore, the relation, $(\epsilon_{LC})//>2\epsilon_{AF}$, holds. The gap d between the substrates is set to be 3.5 μm, and the retardation, d·$\Delta$n, is determined to be about 0.28 μm.

According to the measurement of the response time of the liquid crystal obtained in the above configuration, the rise time is 25 ms, and the fall time is 30 ms.

EMBODIMENT 5

The structure in the embodiment 5 is identical to that of the embodiment 1 excluding the following features.

The material used for the liquid crystal compound is a material disclosed in Japanese Laid-Open Patent No. 2-233626 (1990), made by Chisso, Co., the major component of which is 3,4,5-trifluorobenzene derivative. In this material, $\eta/K_2$ is 23.6 [Gs/(m·m)]. The dielectric anisotropy of the liquid crystal of this embodiment, $\Delta\epsilon$, is 7.3 ($\epsilon//$: 11.0 $\epsilon\perp$: 3.7). Therefore, the relation, $(\epsilon_{LC})//>2\epsilon_{AF}$, holds. The gap d between the substrates is set to be 4.7 μm, and the retardation, d·$\Delta$n, is determined to be about 0.34 μm.

According to the measurement of the response time of the liquid crystal obtained in the above configuration, the rise time is 28 ms, and the fall time is 53 ms.

COMPARISON EXAMPLE 1

The structure used in the comparison example 1 is identical to that of the embodiment 1 excluding the following features.

The material used for the liquid crystal compound is ZLI-2806, the major component of which is trans4,4-dipenthyl-trans-1,1'-dicyclohexane-4-carbonitrile. In this material, $\eta/K_2$ is 46.2 [Gs/(m·m)]. The dielectric anisotropy of the liquid crystal of this comparison example, $\Delta\epsilon$, is −4.8 ($\epsilon//$: 3.3 $\epsilon\perp$: 8.1). Therefore, the relation, $(\epsilon_{LC})\perp>2\epsilon_{AF}$, holds. The gap d between the substrates is set to be 6.2 μm, and the retardation, d·$\Delta$n, is determined to be about 0.27 μm.

The individual rubbing direction of a couple of substrates is parallel to each other, and has an angle of 15° ($\phi_{LC1}=\phi_{LC2}=15°$) against the direction in which the applied electric field is extended. See FIG. 4. The panel is sandwiched with a couple of polarizers (G1220DU, made by Nitto Electric Co.), and the polarization transmission axis of one polarizer is set to be parallel to the rubbing direction, which means $\phi_{P1}=15°$, and the polarization transmission axis of the other polarizer is set to intersect perpendicularly with the former polarization transmission axis, which means $\phi_{P2}=-75°$. With this geometrical configuration, the normally-close characteristic of the display pixel can be established.

According to the measurement of the response time of the liquid crystal obtained in the above configuration, the rise time is 150 ms, and the fall time is 180 ms.

COMPARISON EXAMPLE 2

The structure used in the comparison example 2 is identical to that of the embodiment 1 excluding the following features.

The material used for the liquid crystal compound has such a property that the anisotropic property of the refractive index, $\Delta$n, is 0.0743, the viscosity, $\eta$, is 20 cp (20° C.), and the elasticity constant of the twist, $K_2$, is 4.17 mdyn. Therefore, $\eta/K_2$ is 48.0 [Gs/(m·m)]. The dielectric anisotropy of the liquid crystal of this comparison example, $\Delta\epsilon$, is −1.5 ($\epsilon//$: 3.2 $\epsilon\perp$: 4.7). Therefore, the relation, either of $(\epsilon_{LC})//>2\epsilon_{AF}$ or $(\epsilon_{LC})\perp>2\epsilon_{AF}$ does not hold. The gap d between the substrates is set to be 3.8 μm, and the retardation, d·$\Delta$n, is determined to be about 0.28 μm.

According to the measurement of the response time of the liquid crystal obtained in the above configuration, the rise time is 100 ms, and the fall time is 120 ms.

Figure 7:
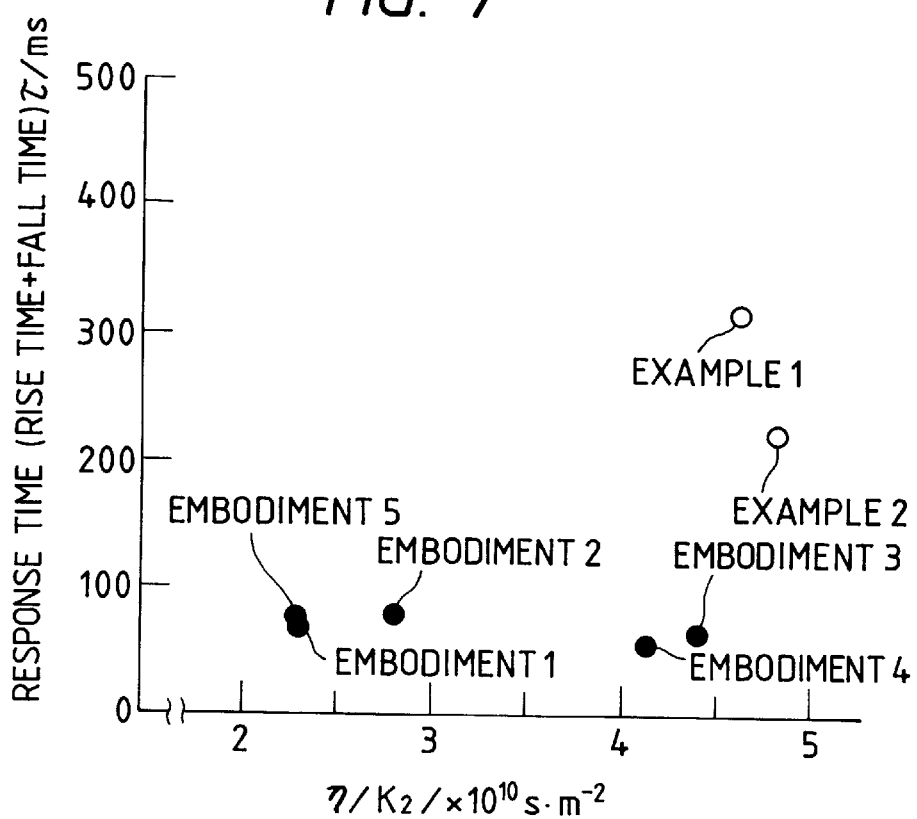
FIG. 7 is a graph showing the relationship between the response speed and the ratio of the viscosity of the liquid crystal to the elasticity constant of the liquid crystal for the embodiments and the comparison examples of the present invention.

In FIG. 7, the relationship between the response speed and the ratio of the viscosity of the liquid crystal to the elasticity constant of the liquid crystal is shown for the embodiments and the comparison examples of the present invention.

According to the present invention, by making the gap between the substrates facing each other less than or equal to 6 μm, a high-speed horizontal electric field method can be attained. In addition, by adjusting the material property of the liquid crystal layer and the orientation layer so as to satisfy the formula (1) and the formula (2), the response time of the liquid crystal in the horizontal electric field method can be reduced. As a result, an active matrix type liquid crystal display apparatus using the horizontal electric field method, which allows a mouse to be used or enables an enhanced motion picture resolution, can be obtained.

We claim:

1. A liquid crystal display apparatus, comprising
   a pair of substrates, at least one of which is transparent;
   a liquid crystal composite material layer disposed between said substrates;
   an orientation control layer for controlling an orientation of a liquid crystal molecule;
   electrodes on said substrates for applying an electric field, substantially in parallel with said substrates;
   a polarization means; and
   a drive means;
   wherein a gap between said substrates is less than or equal to 6 μm, and a response time is less than or equal to 100 ms, and greater than or equal to 1 ms.

2. A liquid crystal display apparatus, comprising:
   a pair of substrates, at least one of which is transparent;
   a liquid crystal composite material layer disposed between said substrates;
   an orientation control layer for controlling an orientation of a liquid crystal molecule;
   electrodes on said substrates for applying an electric field substantially parallel to said substrates;
   a polarization means; and
   a drive means;
   wherein a relationship between viscosity of said liquid crystal composite material layer, $\eta$, and an elasticity constant of a twist, $K_2$, satisfies an equation:

$$\eta/K_2 < 4.5 \times 10^{10} [s \cdot m^{-2}].$$

3. A liquid crystal display apparatus according to claim 2, wherein a relationship between the dielectric constant of said liquid crystal composite material layer, $(\epsilon_{LC})//$: dielectric constant measured in the direction of the longitudinal axis of a molecule, $(\epsilon_{LC})\perp$: dielectric constant measured in the direction of the transverse axis of a molecule), and a dielectric constant of the orientation control layer, ($\epsilon_{AF}$), satisfies an equation:

$$(\epsilon_{LC})// > 2\epsilon_{AF}, \text{ or } (\epsilon_{LC})\perp > 2\epsilon_{AF}.$$

4. A liquid crystal display device having a plurality of switching elements comprising:
   a pair of substrates;
   a liquid crystal composite material layer disposed between said pair of substrates; and
   an electrode structure formed on one of said pair of substrates for generating an electric field having a component predominantly in parallel with said one of said pair of substrates;
   wherein said pair of substrates are spaced from one another by a gap which is no greater than 6 μm, and a response time of said liquid crystal composite material layer to a change of said electric field is no less than 1 ms and no greater than 100 ms.

5. A liquid crystal display device according to claim 4, wherein at least one of said pair of substrates is transparent, and further comprising an orientation control layer for controlling an orientation of a liquid crystal molecule, polarization means, and drive means.

6. A liquid crystal display device according to claim 4, wherein a retardation of said liquid crystal composite material layer is greater than or equal to 0.21 μm, and less than or equal to 0.36 μm.

7. A liquid crystal display device according to claim 6, wherein the retardation of said liquid crystal composite material layer is determined by d·Δn, where d is the distance of the gap and Δn is the anisotropic property of the refractive index of said liquid crystal composite material layer.

8. A liquid crystal display device having a plurality of switching elements, comprising:
   a pair of substrates;
   a liquid crystal composite material layer disposed between said pair of substrates; and
   an electrode structure formed on one of said pair of substrates for generating an electric field having a component predominantly in parallel with said one of said pair of substrates;
   wherein a relationship between viscosity of said liquid crystal composite material layer, η, and an elasticity constant of a twist, $K_2$, satisfies an equation $\eta/K_2 < 4.5 \times 10^{10}$ [s·m$^{-2}$].

9. A liquid crystal display device according to claim 8, wherein a relationship between the dielectric constant of said liquid crystal composite material layer, ($\epsilon_{LC}$)//: dielectric constant measured in the direction of the longitudinal axis of a molecule, ($\epsilon_{LC}$)⊥: dielectric constant measured in the direction of the transverse axis of a molecule), and a dielectric constant of the orientation control layer, ($\epsilon_{AF}$), satisfies an equation:

$$(\epsilon_{LC})// > 2\epsilon_{AF}, \text{ or } (\epsilon_{LC})\perp > 2\epsilon_{AF}.$$

10. A liquid crystal display device according to claim 8, wherein at least one of said pair of substrates is transparent, further comprising an orientation control layer for controlling an orientation of a liquid crystal molecule, polarization means, and drive means.

11. A liquid crystal display apparatus, comprising
   a pair of substrates, at least one of which is transparent;
   a liquid crystal composite material layer disposed between said substrates;
   an orientation control layer for controlling an orientation of a liquid crystal molecule;
   electrodes on said substrates for applying an electric field substantially in parallel with said substrates;
   a polarization means; and
   a drive means;
   wherein a gap between said substrates is less than or equal to 6 μm, and a response time is less than or equal to 100 ms, and greater than or equal to 1 ms; and
   wherein said liquid crystal composite material layer is made to include a liquid crystal chemical compound represented by the following general chemical formula (I), in which a fluoro group or cyano group, or both, coexist as an end group;

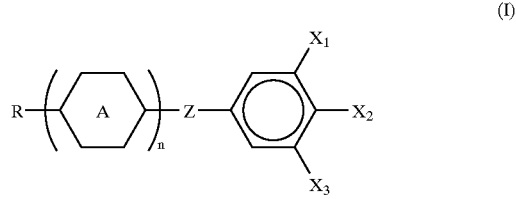

(I)

wherein, $X_1$, $X_2$ and $X_3$ are a fluoro group, cyano group or hydrogen atom; R is an alkyl group or alkoxyl group having a carbon number 1 to 10 which is replaceable; Ring A is a cyclohexane ring, benzene ring, dioxane ring, pyrimidine ring or (2,2,2)-bicyclooctane ring; Z is a single bonding, ester bonding, ether bonding, or methylene, or ethylene; and n is an integer of 1 or 2.

12. A liquid crystal display apparatus, comprising
   a pair of substrates, at least one of which is transparent;
   a liquid crystal composite material layer disposed between said substrates;
   an orientation control layer for controlling an orientation of a liquid crystal molecule;
   electrodes on said substrates for applying an electric field substantially in parallel with said substrates;
   a polarization means; and
   a drive means;
   wherein a gap between said substrates is less than or equal to 6 μm, and a response time is less than or equal to 100 ms, and greater than or equal to 1 ms; and
   wherein said liquid crystal composite material layer is made to include a liquid crystal chemical compound represented by the following general chemical formula (II), in which a fluoro group or cyano group, or both, coexist as an end group;

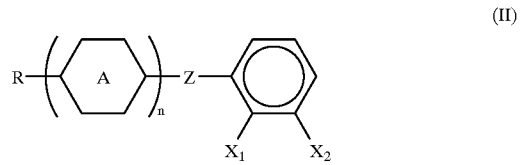

(II)

wherein, $X_1$ and $X_2$ are a fluoro group, cyano group or hydrogen atom; R is an alkyl group or alkoxyl group having a carbon number 1 to 10 which is replaceable; Ring A is a cyclohexane ring, benzene ring, dioxane ring, pyrimidine ring or (2,2,2)-bicyclooctane ring; Z is a single bonding, ester bonding, ether bonding, or methylene or ethylene; and n is an integer of 1 or 2.

13. A liquid crystal display device having a plurality of switching elements comprising:
a pair of substrates;
a liquid crystal composite material layer disposed between said pair of substrates; and
an electrode structure formed on one of said pair of substrates for generating an electric field having a component predominantly in parallel with said one of said pair of substrates;
wherein said pair of substrates are spaced from one another by a gap which is no greater than 6 µm, and a response time of said liquid crystal composite material layer to a change of said electric field is no less than 1 ms and no greater than 100 ms; and
wherein said liquid crystal composite material layer is made to include a liquid crystal chemical compound represented by the following general chemical formula (I), in which a fluoro group or cyano group, or both, coexist as an end group;

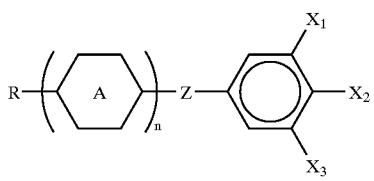

(I)

wherein, $X_1$, $X_2$ and $X_3$ are a fluoro group, cyano group or hydrogen atom; R is an alkyl group or alkoxyl group having a carbon number 1 to 10 which is replaceable; Ring A is a cyclohexane ring, benzene ring, dioxane ring, pyrimidine ring or (2,2,2)-bicyclooctane ring; Z is a single bonding, ester bonding, ether bonding, or methylene, or ethylene; and n is an integer of 1 or 2.

14. A liquid crystal display device having a plurality of switching elements comprising:
a pair of substrates;
a liquid crystal composite material layer disposed between said pair of substrates; and
an electrode structure formed on one of said pair of substrates for generating an electric field having a component predominantly in parallel with said one of said pair of substrates;
wherein said pair of substrates are spaced from one another by a gap which is no greater than 6 µm, and a response time of said liquid crystal composite material layer to a change of said electric field is no less than 1 ms and no greater than 100 ms; and
wherein said liquid crystal composite material layer is made to include a liquid crystal chemical compound represented by the following general chemical formula (II), in which a fluoro group or cyano group, or both, coexist as an end group;

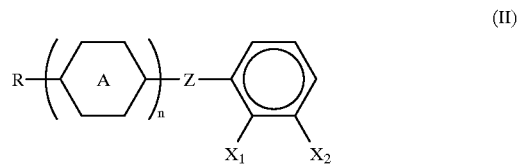

(II)

wherein, $X_1$ and $X_2$ are a fluoro group, cyano group or hydrogen atom; R is an alkyl group or alkoxyl group having a carbon number 1 to 10 which is replaceable; Ring A is a cyclohexane ring, benzene ring, dioxane ring, pyrimidine ring or (2,2,2)-bicyclooctane ring; Z is a single bonding, ester bonding, ether bonding, or methylene or ethylene; and n is an integer of 1 or 2.

15. A liquid crystal display apparatus as defined in any one of claims 1, 2, 11 and 12, wherein a retardation of said liquid crystal composite material layer, d·Δn, is greater than or equal to 0.21 µm, and less than or equal to 0.36 µm.

* * * * *